US007692359B2

(12) United States Patent
Sasaki

(10) Patent No.: US 7,692,359 B2
(45) Date of Patent: Apr. 6, 2010

(54) DRIVING APPARATUS

(75) Inventor: Ryota Sasaki, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 85 days.

(21) Appl. No.: 12/163,454

(22) Filed: Jun. 27, 2008

(65) Prior Publication Data
US 2009/0021116 A1 Jan. 22, 2009

(30) Foreign Application Priority Data
Jul. 17, 2007 (JP) ............................. P2007-186141

(51) Int. Cl.
*H02N 2/00* (2006.01)
(52) U.S. Cl. .............................. 310/323.17; 310/323.01
(58) Field of Classification Search .................. 310/311, 310/323.01–323.19, 328
See application file for complete search history.

(56) References Cited
U.S. PATENT DOCUMENTS
5,668,432 A * 9/1997 Tominaga et al. ........... 310/328

6,320,298 B1 * 11/2001 Kawabe ...................... 310/317
6,528,926 B2   3/2003 Okamoto et al.
6,762,535 B2 * 7/2004 Take et al. .............. 310/323.18
7,129,622 B2 * 10/2006 Rosmalen et al. ........... 310/328
2006/0238074 A1   10/2006 Manabe

FOREIGN PATENT DOCUMENTS
JP   2002-142470 A   5/2002
JP   2007-74889 A    3/2007

* cited by examiner

*Primary Examiner*—Thomas M Dougherty
(74) *Attorney, Agent, or Firm*—Birch, Stewart, Kolasch & Birch, LLP

(57) ABSTRACT

A driving apparatus comprises: an electromechanical conversion element that expands and contracts in an extending direction of a given fiducial line; a driving shaft that is fixed to one end of the electromechanical conversion element in the extending direction; a driven body that is frictionally engaged with the driving shaft; a holder that holds, through an adhesive, the electromechanical conversion element from lateral sides with respect to the extending direction; and a flange member that is provided on the driving shaft between (i) a moving region of the driven body on the driving shaft and (ii) the electromechanical conversion element.

2 Claims, 6 Drawing Sheets

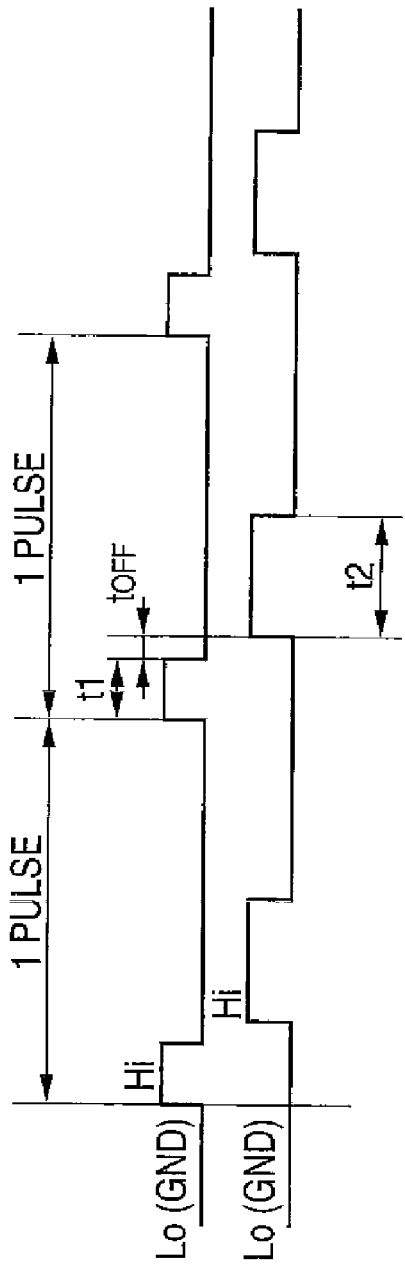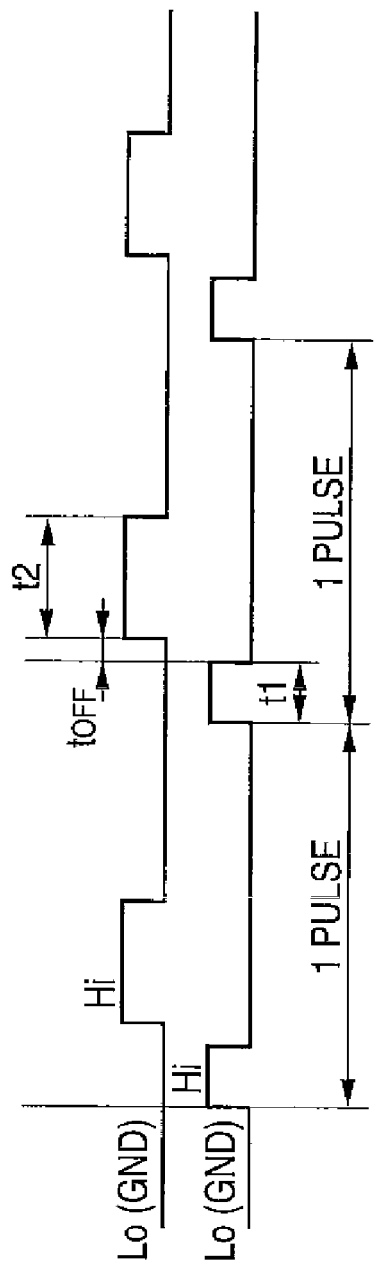
FIG. 4A
FIG. 4B

DRIVING APPARATUS

BACKGROUND OF THE INVENTION

1. Field of the Invention

The present invention relates to a driving apparatus which is favorably used for driving a lens or the like in a mobile phone provided with a camera, a compact digital camera, etc.

2. Description of the Related Art

As the related-art driving apparatus in the above described technical field, there has been known a driving apparatus including an electromechanical conversion element which is expanded and contracted in an extending direction of a given fiducial line, a driving shaft which is fixed to one end of the electromechanical conversion element in the extending direction of the given fiducial line, a driven body which is frictionally engaged with the driving shaft, and a holder for holding the other end of the electromechanical conversion element in the extending direction of the given fiducial line (See JP-A-2002-142470, for example).

In the driving apparatus of this type, a driving pulse having a sawtooth waveform is inputted to the electromechanical conversion element, whereby the electromechanical conversion element is deformed in a state where its expansion speed and contraction speed are different from each other. When the electromechanical conversion element is deformed at a low speed, the driven body rests still with respect to the driving shaft by friction force, and on the contrary, when the electromechanical conversion element is deformed at a high speed, the driven body moves with respect to the driving shaft by inertia. Therefore, by repeatedly inputting the driving pulse having the sawtooth waveform to the electromechanical conversion element, it is possible to intermittently move the driven body at a small pitch.

However, in the driving apparatus as described above, the other end of the electromechanical conversion element in the extending direction of the given fiducial line is fixed to the holder. For this reason, there is such a problem that the holder resonates with the expansion and contraction of the electromechanical conversion element, and the driven body will not be reliably moved. In order to solve such problem, an art of holding the electromechanical conversion element from lateral sides with respect to the extending direction of the given fiducial line is advantageously employed (See JP-A-2007-74889, for example).

However, in the driving apparatus which employs the art of holding the electromechanical conversion element from the lateral sides with respect to the extending direction of the given fiducial line, there is such anxiety that the adhesive for holding the electromechanical conversion element by the holder may flow out to the moving region of the driven body on the driving shaft, and as the results, the movement of the driven body may be hindered.

SUMMARY OF THE INVENTION

The invention has been made in view of the above described circumstances, and it is an object of the invention to provide a driving apparatus in which an adhesive for holding an electromechanical conversion element by a holder can be prevented from flowing out to a moving region of a driven body on a driving shaft.

In order to attain the above described object, there is provided, according to the invention, a driving apparatus comprising: an electromechanical conversion element that expands and contracts in an extending direction of a given fiducial line; a driving shaft that is fixed to one end of the electromechanical conversion element in the extending direction; a driven body that is frictionally engaged with the driving shaft; a holder that holds, through an adhesive, the electromechanical conversion element from lateral sides with respect to the extending direction; and a flange member that is provided on the driving shaft between (i) a moving region of the driven body on the driving shaft and (ii) the electromechanical conversion element.

In this driving apparatus, the flange member is provided on the driving shaft, and this flange member is positioned between the moving region of the driven body on the driving shaft and the electromechanical conversion element. Therefore, the flange member becomes a barrier, and the adhesive for holding the electromechanical conversion element by the holder from the lateral sides with respect to the given fiducial line can be prevented from flowing out to the moving region of the driven body on the driving shaft.

In the driving apparatus according to the invention, it would be preferable that the holder comprises a pair of partition parts that restrict the moving region; and the flange member is provided at a side, closer to the moving region, of one of the partition parts which is closer to the electromechanical conversion element. In this case, by forming the flange member out of more elastic material than the partition part at the side of the electromechanical conversion element, the flange member functions as a damper, even though the driven body is on the verge of colliding against the partition part at the side of the electromechanical conversion element due to a drop or so of the apparatus, and hence, damage of the driven body can be prevented.

BRIEF DESCRIPTION OF THE DRAWINGS

FIGS. 4A and 4B are waveform charts of input signals to be inputted to the driving circuit as shown in FIG. 3;

DETAILED DESCRIPTION OF THE INVENTION

Figure 1:
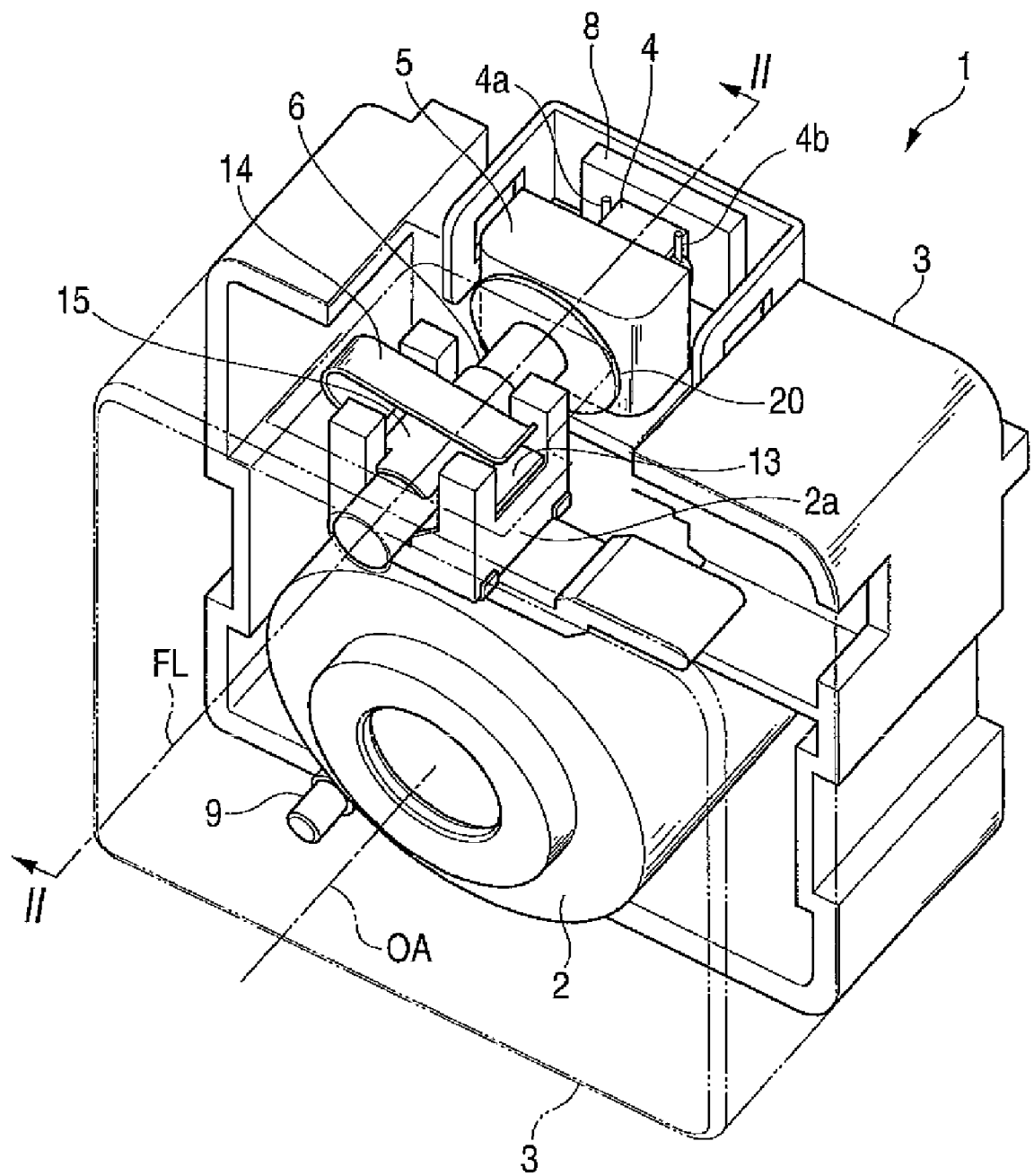
FIG. 1 is a perspective view showing an embodiment of the driving apparatus according to the invention.

Now, a preferred embodiment of the invention will be described in detail, referring to the drawings. It is to be noted that in the drawings, the same or equivalent parts will be denoted with the same reference numerals and overlapped descriptions will be omitted.

Figure 2:
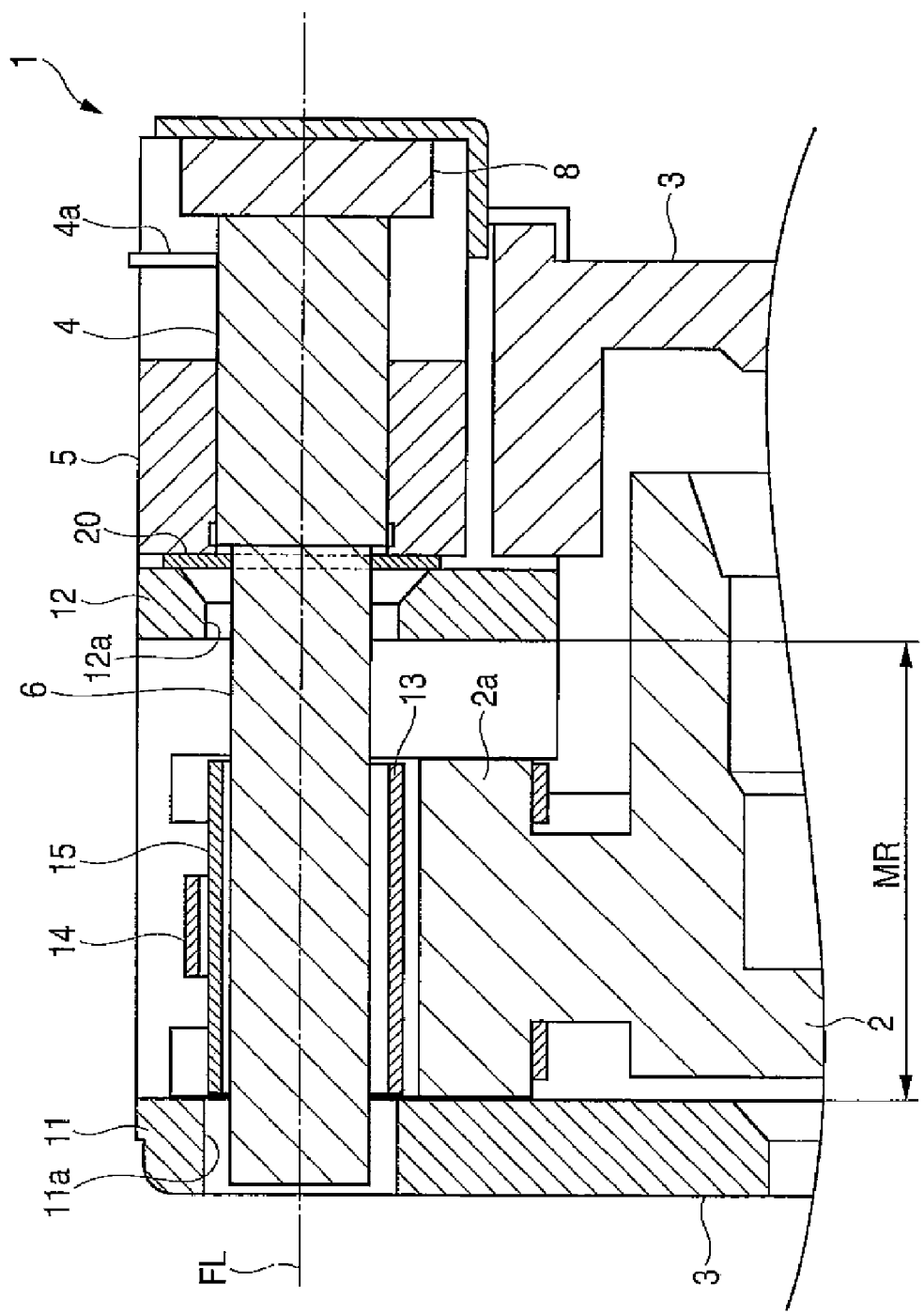
FIG. 2 is a fragmentary sectional view taken along a line II-II in FIG. 1.

FIG. 1 is a perspective view showing an embodiment of the driving apparatus according to the invention, FIG. 2 is a fragmentary sectional view taken along a line II-II in FIG. 1. As shown in FIGS. 1 and 2, a driving apparatus 1 is an apparatus for driving a lens which is held by a lens frame (a driven body) 2 along an optical axis OA, and favorably employed, for example, in a mobile phone provided with a camera, a compact digital camera, etc.

The driving apparatus 1 includes a holder 3 which contains the lens frame 2. The holder 3 supports a piezoelectric element (an electromechanical conversion element) 4 which is expanded and contracted in an extending direction of a fiducial line FL which is parallel to the optical axis OA. Specifically, the piezoelectric element 4 is held from lateral sides with respect to the extending direction of the fiducial line FL by a silicone cap 5 which is bonded to the holder 3 with a silicone adhesive, thereby to be resiliently supported by the holder 3. Moreover, the piezoelectric element 4 is provided with input terminals 4a, 4b for inputting driving pulses.

A driving shaft 6 is fixed to one end of the piezoelectric element 4 in the extending direction of the fiducial line FL with an adhesive so as to extend along the fiducial line FL. The driving shaft 6 is formed of a graphite complex such as carbon graphite which is a rigid complex of graphite crystals, and formed into a columnar shape. On the other hand, a weight member 8 is fixed to the other end of the piezoelectric element 4 in the extending direction of the fiducial line FL with an adhesive. The weight member 8 is provided for the purpose of applying load to the other end of the piezoelectric element 4 thereby to prevent the other end of the piezoelectric element 4 from being displaced by a larger amount than the one end thereof. In order to efficiently transmit the expansion and contraction of the piezoelectric element 4 to the driving shaft 6, the weight member 8 preferably has a larger mass than the driving shaft 6.

One end portion of the driving shaft 6 is clearance-fitted into a bearing hole 11a which is formed in a partition part 11 of the holder 3. On the other hand, the other end portion of the driving shaft 6 is passed through a through hole 12a which is formed in a partition part 12 of the holder 3. In this manner, the driving shaft 6 can move back and forth along the fiducial line FL.

An engaging part 2a of the lens frame 2, of which a moving region MR is restricted by means of a pair of the partition parts 11, 12 between them, is frictionally engaged with the driving shaft 6. Specifically, the driving shaft 6 is clamped between a plate member 13 having a V-shape in section which is fixed to the engaging part 2a, and a plate member 15 having a V-shape in section which is urged toward the plate member 13 by a leaf spring 14 locked to the engaging part 2a, whereby the engaging part 2a is fitted to the driving shaft 6 so that a given friction force may occur when the engaging part 2a moves. Moreover, a shaft 9 which is positioned in a groove having a U-shape in section in the lens frame 2 is suspended in the holder 3 along the extending direction of the fiducial line FL. In short, the driving shaft 6 functions also as a guide shaft for the lens frame 2, and the shaft 9 functions as a rotation detent shaft for the lens frame 2.

Further, the driving shaft 6 is provided with a flange member 20 between the moving region MR of the engaging part 2a on the driving shaft 6 and the one end of the piezoelectric element 4, and behind the partition part 12 close to the piezoelectric element 4. The flange member 20 is formed of elastic material such as rubber or resin into a shape of an annular plate, and liquid-tightly fitted to the driving shaft 6. It is to be noted that an outer diameter of the flange member 20 is larger than an inner diameter of the through hole 12a of the partition part 12.

In the driving apparatus 1 having the above described structure, the flange member 20 which is liquid-tightly fitted to the driving shaft 6 is positioned between the moving region MR of the engaging part 2a on the driving shaft 6 and the one end of the piezoelectric element 4. Consequently, the flange member 20 becomes a barrier, and the silicone adhesive for holding the piezoelectric element 4 by the holder 3 from the lateral sides with respect to the fiducial line FL can be prevented from flowing out to the moving region MR of the driving shaft 6. In this manner, it is possible to reliably move the engaging parts 2a of the lens frame 2 in the moving region MR of the driving shaft 6.

Because a flow of the adhesive to the moving region MR of the driving shaft 6 is prevented by the flange member 20, it is possible to use various adhesives having lower viscosity than the silicone adhesive, such as a UV-setting adhesive, a thermosetting adhesive, or an instantaneous adhesive, as the adhesive for holding the piezoelectric element 4 by the holder 3. Because the UV-setting adhesive, thermosetting adhesive, instantaneous adhesive, etc. can be hardened in a shorter time as compared with the silicone adhesive which is naturally hardened, it is possible to enhance working efficiency in manufacturing the driving apparatus 1.

In addition, because the outer diameter of the flange member 20 is larger than the inner diameter of the through hole 12a of the partition part 12, it is possible to prevent passage of a strange obstacle through the through hole 12a.

Figure 3:
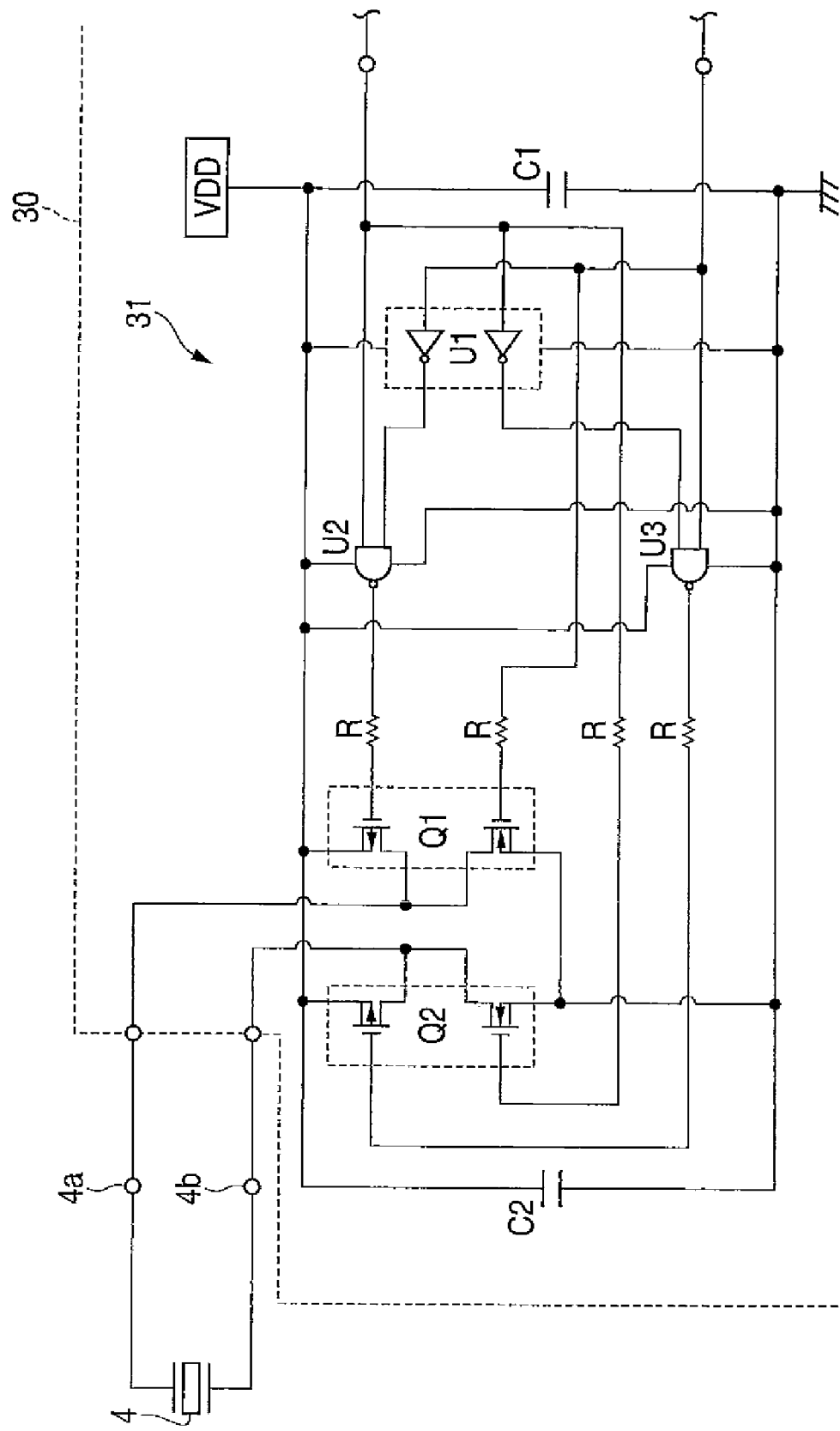
FIG. 3 is a circuit diagram of a driving circuit for operating the piezoelectric element as shown in FIG. 1.

Now, operation of the driving apparatus 1 will be described. FIG. 3 is a circuit diagram of a driving circuit for operating the piezoelectric element as shown in FIG. 1. FIGS. 4A and 4B are waveform charts of input signals to be inputted into the driving circuit as shown in FIG. 3, and FIGS. 5A and 5B are waveform charts of output signals to be outputted from the driving circuit as shown in FIG. 3.

As shown in FIG. 3, the driving circuit 31 is provided in a control part 30. The control part 30 controls an entirety of the driving apparatus 1, and includes, for example, a CPU, a ROM, a RAM, an input signal circuit, and an output signal circuit. The driving circuit 31 functions as a driving circuit for the piezoelectric element 4, and outputs an electric signal for driving the piezoelectric element 4. The driving circuit 31 receives a control signal inputted from a control signal generating part in the control part 30, and amplifies electric voltage and electric current of the control signal to output the electric signal for driving the piezoelectric element 4. The driving circuit 31 of a type including an input stage composed of logic circuits U1 to U3, and an output stage composed of field-effect transistors (FET) Q1, Q2, for example, is used. The transistors Q1, Q2 can output a Hi output (a high potential output), a Lo output (a low potential output), and an OFF output (an open output), as the output signals.

FIG. 4A shows input signals which are inputted, when the lens frame 2 is displaced so that the engaging part 2a may approach the piezoelectric element 4, and FIG. 4B shows input signals which are inputted, when the lens frame 2 is displaced so that the engaging part 2a may be separated from the piezoelectric element 4. FIG. 5A shows output signals which are outputted, when the lens frame 2 is displaced so that the engaging part 2a may approach the piezoelectric element 4, and FIG. 5B shows output signals which are outputted, when the lens frame 2 is displaced so that the engaging part 2a may be separated from the piezoelectric element 4.

Figure 5A:
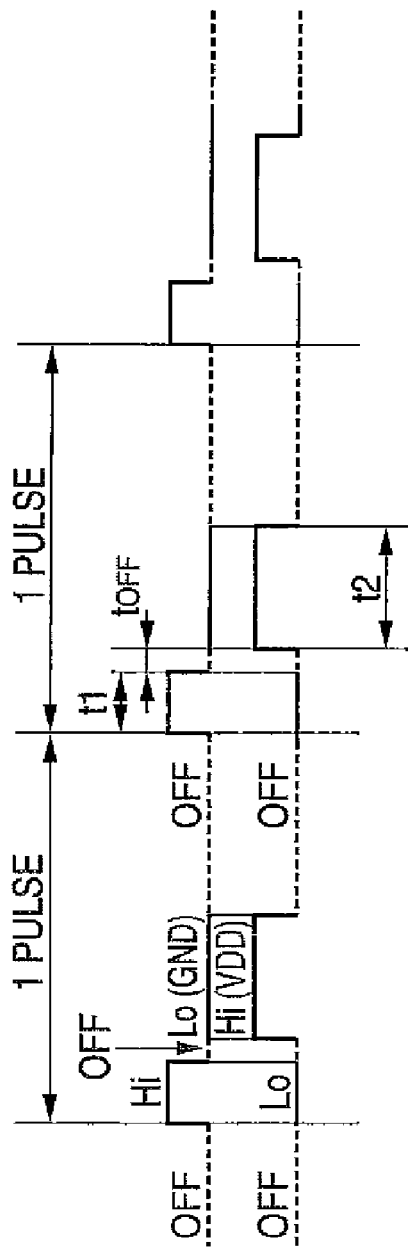
FIGS. 5A and 5B are waveform charts of output signals to be outputted from the driving circuit as shown in FIG. 3.
Figure 5B:
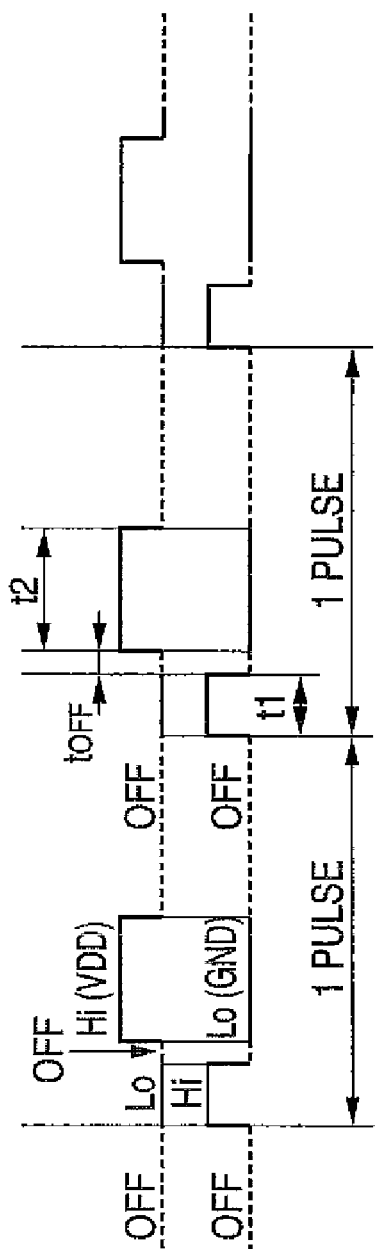

The output signals in FIGS. 5A and 5B are pulse signals which are turned ON/OFF at equal timing to the input signals in FIGS. 4A and 4B. The two output signals in FIGS. 5A and 5B are inputted to the input terminals 4a, 4b of the piezoelectric element 4. Although the pulse signals having a sawtooth waveform may be inputted to the input terminals 4a, 4b, it is also possible to operate the piezoelectric element 4 by inputting the pulse signals having a rectangular waveform, as shown in FIGS. 5A and 5B. In this case, the signals can be easily generated, because the signals for driving the piezoelectric element 4 may be the pulse signals having the rectangular waveform.

The output signals in FIGS. 5A and 5B are composed of two pulse signals having the same frequency. By staggering the phases of these two pulse signals, the signals having an electric potential between them stepwise increased and abruptly decreased, or the signals having the electric potential between them abruptly increased and stepwise decreased are obtained. By inputting these two signals, an expansion speed and a contraction speed of the piezoelectric element 4 can be made different, and it becomes possible to move the engaging part 2a, accordingly, the lens frame 2.

For example, in FIGS. 5A and 5B, it is so set that after one of the signals has become Lo from Hi, the other signal becomes Hi. In these signals, it is so set that when the one signal has become Lo, the other signal becomes Hi, after a given time lag $t_{OFF}$ has lapsed. In case where both of the two signals are Lo, the output will be in an OFF state (an open state).

The output signals in FIGS. 5A and 5B, that is, the electric signals for driving the piezoelectric element 4, the signals having larger frequency than the audible frequency are used. In FIGS. 5A and 5B, the frequency of the two signals is larger than the audible frequency, for example, the frequency of 30 to 80 kHz, more preferably, 40 to 60 kHz. By using the signals of such frequency, operation noise of the piezoelectric element 4 in an audible region can be reduced.

According to the above described structure, the driving apparatus 1 is operated as follows. Specifically, the electric signals are inputted to the piezoelectric element 4, and the piezoelectric element 4 repeats the expansion and contraction according to the input of the electric signals. According to the expansion and contraction, the driving shaft 6 moves back and forth. On this occasion, the expansion speed and the contraction speed of the piezoelectric element 4 are made different from each other, whereby a moving speed of the driving shaft 6 in one direction becomes different from the moving speed thereof in the other direction. As the results, the engaging part 2a, accordingly, the lens frame 2 will be moved in a desired direction.

The invention is not limited to the above described embodiment.

Figure 6:
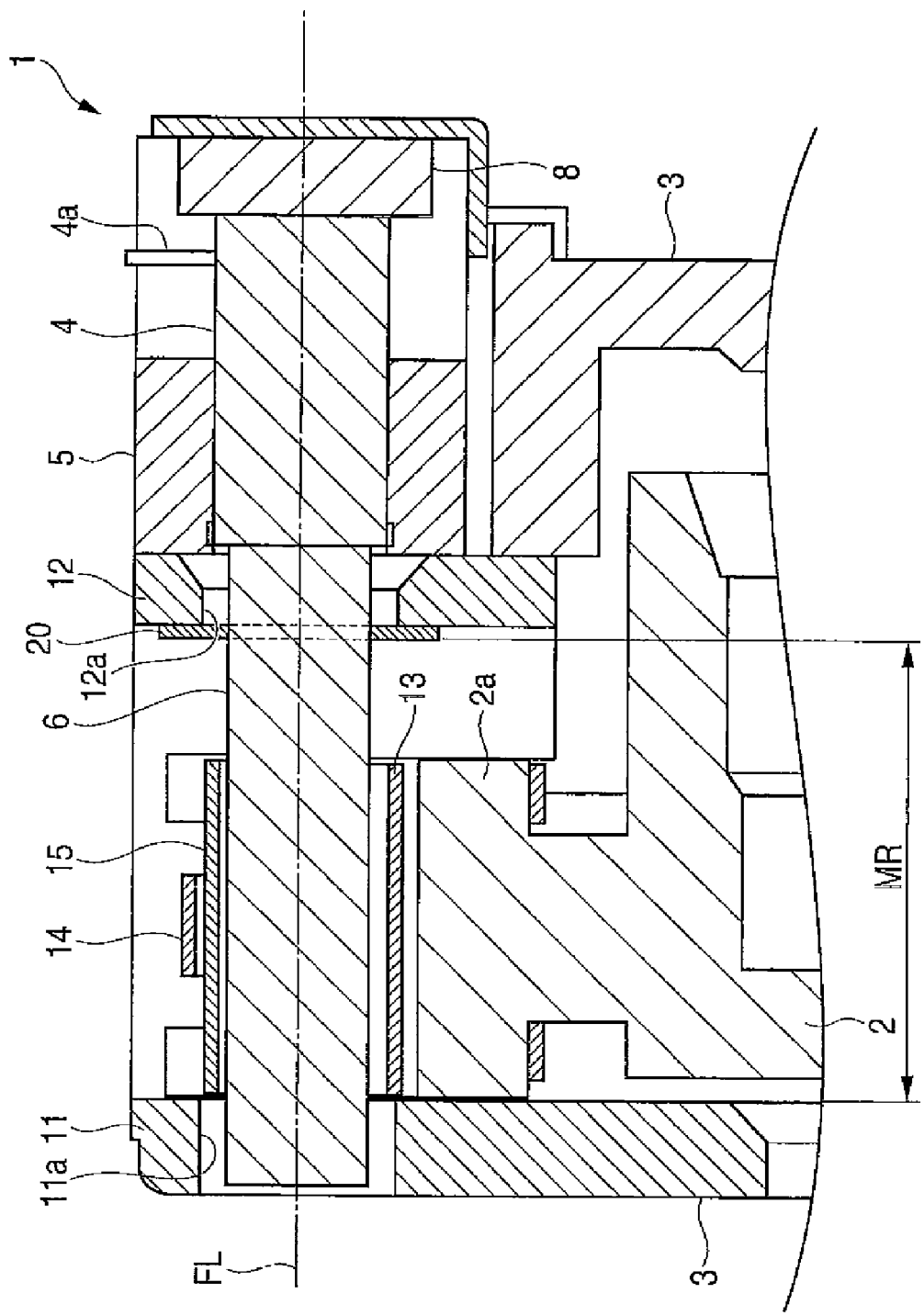
FIG. 6 is a fragmentary sectional view showing another embodiment of the driving apparatus according to the invention.

For example, as shown in FIG. 6, the flange member 20 may be provided on the driving shaft 6 between the moving region MR of the engaging part 2a on the driving shaft 6 and the one end of the piezoelectric element 4, in front of the partition part 12 at a side of the moving region MR. In this case, by forming the flange member 20 out of more elastic material than the partition part 12 (rubber or resin, for example), the flange member 20 functions as a damper, even though the engaging part 2a is on the verge of colliding against the partition part 12 due to a drop or so of the apparatus, and hence, a shock to the engaging part 2a can be reduced.

Moreover, because the flange member 20 prevents the adhesive from flowing out to the moving region MR of the driving shaft 6, it is possible to employ only the elastic adhesive such as the silicone adhesive, so that the piezoelectric element 4 may be held by the holder 3 without employing the silicone cap 5.

Further, the driving shaft 6 and the flange member 20 are not limited to those formed as separate bodies, but may be integrally formed.

Still further, in case where the piezoelectric element 4 is held by the holder 3 from the lateral sides with respect to the extending direction of the fiducial line FL, the weight member 8 need not be fixed to the other end of the piezoelectric element 4.

According to the invention, it is possible to prevent the adhesive for holding the electromechanical conversion element by the holder from flowing out to the moving region of the driven body on the driving shaft.

The entire disclosure of each and every foreign patent application from which the benefit of foreign priority has been claimed in the present application is incorporated herein by reference, as if fully set forth.

What is claimed is:

1. A driving apparatus comprising:
   an electromechanical conversion element that expands and contracts in an extending direction of a given fiducial line;
   a driving shaft that is fixed to one end of the electromechanical conversion element in the extending direction;
   a driven body that is frictionally engaged with the driving shaft;
   a holder that holds, through an adhesive, the electromechanical conversion element from lateral sides with respect to the extending direction; and
   a flange member that is provided on the driving shaft between (i) a moving region of the driven body on the driving shaft and (ii) the electromechanical conversion element.

2. A driving apparatus as claimed in claim 1,
   wherein the holder comprises a pair of partition parts that restrict the moving region; and
   the flange member is provided at a side, closer to the moving region, of one of the partition parts which is closer to the electromechanical conversion element.

* * * * *